April 1, 1924.  
F. H. AVERS  
1,489,106  
DEVICE FOR INSPECTING MOTION PICTURE FILMS  
Filed Aug. 20, 1921  2 Sheets-Sheet 1
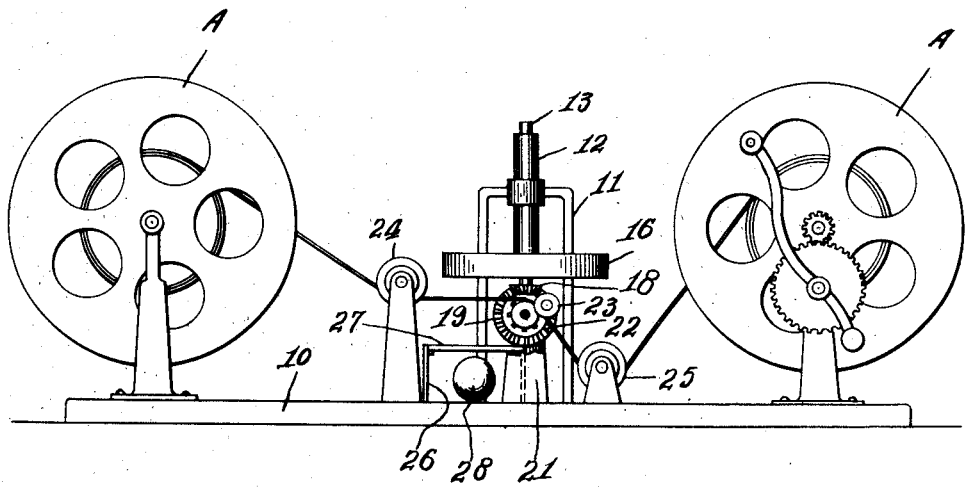
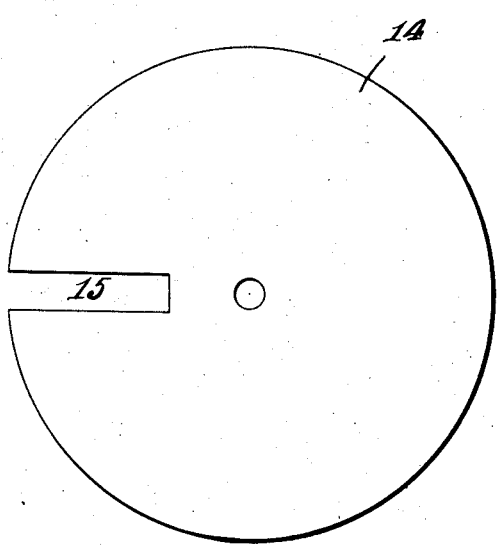
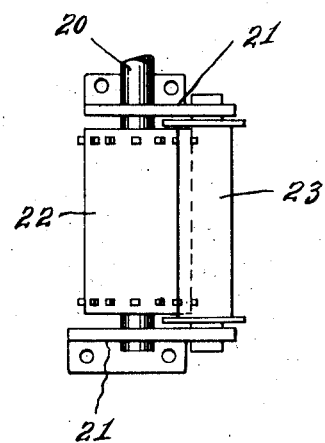
Franklin H. Avers
INVENTOR
BY Victor J. Evans
ATTORNEY April 1, 1924.
F. H. AVERS
1,489,106
DEVICE FOR INSPECTING MOTION PICTURE FILMS
Filed Aug. 20, 1921    2 Sheets-Sheet 2
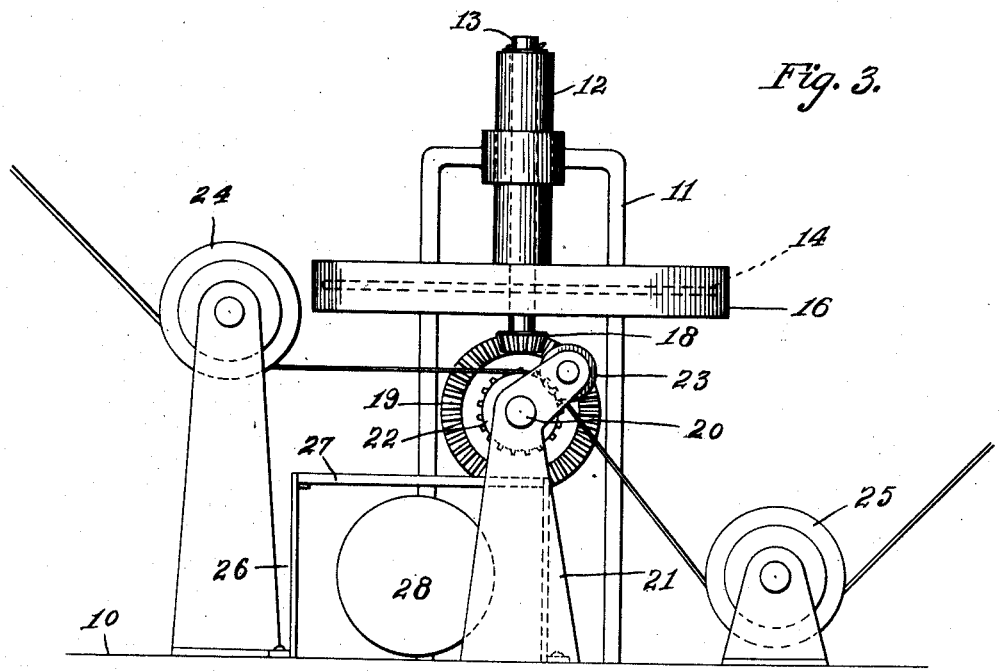
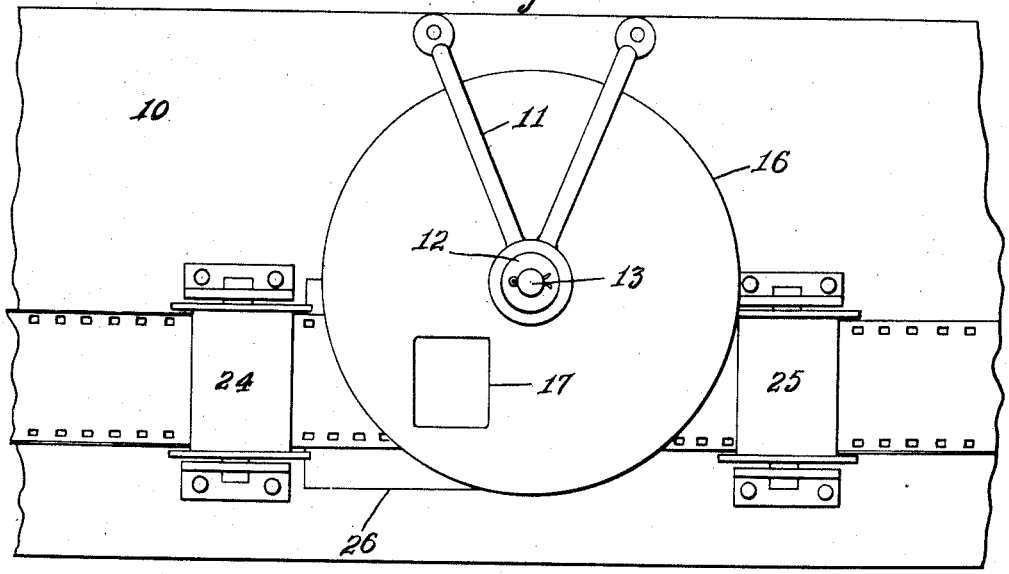

Patented Apr. 1, 1924.

1,489,106

UNITED STATES PATENT OFFICE.

FRANKLIN H. AVERS, OF PORTAGE, WISCONSIN.

DEVICE FOR INSPECTING MOTION-PICTURE FILMS.

Application filed August 20, 1921. Serial No. 493,898.

*To all whom it may concern:*

Be it known that I, FRANKLIN H. AVERS, a citizen of the United States, residing at Portage, in the county of Columbia and State of Wisconsin, have invented new and useful Improvements in Devices for Inspecting Motion-Picture Films, of which the following is a specification.

This invention relates to testing devices and has for its object the provision of a machine for testing motion picture films whereby to ascertain whether or not the film contains any defect such as mis-frames, short titles or other blemishes.

An important object is the provision of a device of this character which is adapted for inter-position within the rewind mechanism of a motion picture film machine, the device being driven by movement of the film in the rewinding operation.

Another object is the provision of a device of this character which will be simple and inexpensive in construction, highly efficient in use, positive in action, durable in service and a general improvement in the art.

With the above and other objects and advantages in view, the invention consists in the details of construction to be hereinafter more fully described and claimed, and illustrated in the accompanying drawings, in which:

Figure 1 is an elevation of my device showing it associated with the film rewind mechanism;

Figure 2 is a plan view of my device alone.

Figure 3 is an elevation thereof on a larger scale.

Figure 4 is a plan view of the revolving shutter, and Figure 5 is a detail view of the film feeding means.

Referring more particularly to the drawings, the letter A designates a portion of the rewinding mechanism for the film of a motion picture apparatus, this mechanism including the usual reel arrangement. My invention is designed to be placed between the reel of the rewind mechanism and includes a suitable supporting base 10 from which rises an arm 11 carrying a bearing 12 through which is journaled a substantially vertically disposed shaft 13 which carries a revolving disk 14 constituting a shutter. This disk is formed with a slot 15 and rotates within a casing 16 rigidly secured with respect to the bearing 12 and provided on its top with a cut-out portion 17 constituting a sight opening. Secured upon the lower end of the shaft 13, that is below the casing 16 is a bevel pinion 18 which meshes with a bevel gear 19 secured upon a horizontally disposed shaft 20 journaled in suitable bearings 21 and carrying a sprocket 22 having beads of such size and shape as to engage within the perforations B at the edges of a strip of film C. Journaled adjacent the ear 19 is an idle roller 23 serving to prevent the strip of film from becoming disengaged from the sprocket 22. The numeral 24 designates another roller which serves as a guide and which is flanged for the passage of a strip of film thereof. At the opposite side of the machine is disposed a similar roller 25 which is for the same purpose.

Suitably mounted upon the base 10 below the casing 16 and associated part is a lamp house 26 having a ground glass top 27 and having disposed therein an incandescent bulb 28 adapted to be energized when desired. In the operation of the device it will be seen that when my device is interposed in the rewind mechanism of a film, and the film is fed from one reel to the other of the rewind mechanism, the engagement of the film with the sprocket 22 will cause the sprocket 22 and consequently the shaft 20 to be rotated whereupon the gear 19 which is also rotated will cause rotation of the pinion 18 and shaft 13 and this will of course result in rotation of the shutter disk 14. It is intended that the operator look through the sight opening 17 whereupon it will be apparent that owing to the gear ratio of the gears 19 and 18 and the rotation of the shutter 14 the operator may view the successive film exposures through the slot 15 in the shutter disk. In this way is will be apparent that as the incandescent bulb 28 beneath the ground glass top 27 of the casing or lamp house 26 will display the film to the operator very clearly so that any defect in the film may be readily ascertained so that repairs or corrections may be made as necessary. It is also of course to be understood that any suitable magnifying glass, not shown, might be disposed above the sight opening 17 in the casing 16 so as to enlarge the film so that the operator might still more readily inspect any defects such as misframes, short titles and other blemishes or undesirable features.

From the foregoing description and a study of the drawings it will be apparent that I have thus provided an extremely simple and inexpensive device which is easily operated, which requires no power other than that imparted to it by the film in passing from one reel to another of the rewind mechanism, and which will very efficiently operate to perform all the functions for which it is intended.

While I have shown and described the preferred embodiment of the invention, it is of course to be understood that I reserve the right to make such changes in the form, construction and arrangement of parts as will not depart from the spirit of the invention or the scope of the subjoined claim.

Having thus described my invention I claim:

A film inspecting device comprising the combination with the rewinding mechanism of a projecting apparatus of an upright support, a casing of circular formation carried thereby and arranged in horizontal position, said casing having its top and bottom provided with registering sight openings, a spindle rotatably mounted through said support and the center of the casing and carrying a shutter for covering and uncovering the registering openings in rapid succession, a pair of guide rollers mounted at opposite sides of the support and against which the film bears in passing to the rewinding mechanism from the projection machine, a bevel gear on the lower end of said spindle, a shaft journaled below said spindle and carrying a gear meshing with said bevel pinion and a toothed roller on said last named shaft having its teeth engaged by the perforations commonly provided in the edges of the film strip whereby the shutter will be operating synchronously with the movement of the film.

In testimony whereof I affix my signature.

FRANKLIN H. AVERS.